Feb. 20, 1962 C. S. SZEGHO Re. 25,127

CATHODE-RAY TUBE

Original Filed March 13, 1957

2 Sheets-Sheet 1

INVENTOR.
Constantin S. Szegho
BY John J. Pederson
Attorney

Feb. 20, 1962

C. S. SZEGHO

CATHODE-RAY TUBE

Re. 25,127

Original Filed March 13, 1957

2 Sheets-Sheet 2

Inventor
Constantin S. Szegho
by John J. Pederson
Attorney

United States Patent Office

Re. 25,127
Reissued Feb. 20, 1962

25,127
CATHODE-RAY TUBE

Constantin S. Szegho, Chicago, Ill., assignor to The Rauland Corporation, a corporation of Illinois Original No. 2,975,315, dated Mar. 14, 1961, Ser. No. 645,813, Mar. 13, 1957. Application for reissue July 26, 1961, Ser. No. 128,322
10 Claims. (Cl. 315—16)

Matter enclosed in heavy brackets [ ] appears in the original patent but forms no part of this reissue specification; matter printed in italics indicates the additions made by reissue.

The present invention relates to image reproducers of the cathode-ray tube type. More particularly, it relates to high-transconductance cathode-ray tubes adapted for use in television receivers and the like.

With the ever increasing interest in the application of transistors to existing electronic apparatus, problems have arisen which dictate the need for improvements in the sensitivity and operational characteristics of certain existing circuit components. Such a problem arises in the transistorization of the video channel of conventional television receivers. As is well known, the electron guns used in present-day picture tubes are, by virtue of the electrode structure used and the mode of operation, relatively low-transconductance devices. This being so, it is necessary to drive such electron guns with video signals often having peak amplitudes of the order of 100 volts to produce image contrast commensurate with present day picture reproduction standards. When an attempt is made to substitute transistors for the more conventional vacuum tubes found in present day video amplifiers, the resulting output video signal drive is inadequate to produce acceptable contrast in picture tubes using conventional electron guns. While transistors described as capable of producing video signals having amplitudes in excess of 80 volts have appeared in the literature, such transistors are predominantly of an experimental nature and hence are, for the most part, too unpredictable and expensive for application in low-cost mass-produced television receivers. Experience has shown that readily available transistors are capable of supplying continuous and reliable video signals of five to ten volts amplitude. Resorting to the use of such available, relatively low-cost transistors for application in video amplifiers dictates the need for an electron gun having a transconductance which is an order of magnitude higher than the transconductance of presently available electron guns if comparable image reproduction is to be achieved using the substantially reduced level of video drive.

Conventional electron guns are normally composed of a thermionic cathode, an apertured control electrode, and an accelerator electrode system for creating an electron stream and for accelerating and forming this stream into a discrete high-velocity beam. Emission is normally drawn from the cathode region through the apertured control electrode by penetration of the accelerator field to the region of the cathode emissive surface. Accordingly, the density of the resultant electron stream is most easily varied by effectively varying the depth of penetration of the accelerator field, and, as a result, the intensity of the field at the emissive surface of the cathode. This is normally accomplished by the application of a variable negative potential to the apertured control electrode which has the effect of electrically varying the cross-sectional area of the aperture and hence the depth of penetration of the accelerator field. By decreasing the physical size of the aperture, its effect on the field intensity in the cathode region, for an incremental change in the magnitude of the applied voltage, can be increased thereby providing an improvement in transconductance. Practically speaking, however, to realize the magnitude of improvement required, it is necessary to physically decrease the cross-sectional area of the aperture to the point where it is impossible to obtain the average density of beam current required to provide the necessary brightness of a reproduced image in picture tube application. As such, this approach to improving gun transconductance has proven to be impractical without extensive modification of the gun and the use of prohibitively high accelerating potentials.

It has been suggested that a similar improvement in the effective transconductance of present day electron guns can be accomplished by placing an electron-permeable conductive cover, preferably of the mesh type, over the aperture contained in the control electrode. This has the effect of breaking up the aperture cross-sectional area into a plurality of smaller apertures which are capable of more easily controlling the depth of penetration of the accelerator field. The application of a substantially smaller incremental change in control electrode potential, relative to that required by the unmodified aperture, is thus capable of producing a comparable change in the density of the electron stream.

While experimental results have shown that the use of such an electron-permeable mesh cover results in an increase in transconductance of an order of magnitude, certain serious problems are introduced by its use. Since the mesh tends to electrostatically shield the cathode region the average intensity of the penetrating accelerator field is reduced, resulting in a decrease in the average density of the electron stream. In other words, the opaque portions of the mesh tend to reduce the depth of penetration of the accelerator field; hence the emissive surface of the cathode is not subjected to a field intensity equivalent to that which existed before modification of the aperture. As a result, the number of electrons drawn from the region of the cathode through the control electrode aperture is substantially reduced. This condition manifests itself as a decrease in the average brightness of the spot produced on the phosphor screen. If the average brightness of the spot is to be re-established at its original level, it becomes necessary to decrease the spacing between the cathode emissive surface and the mesh covered aperture. This effectively moves the emissive surface into a region where the penetrating accelerator field has an intensity which is equivalent to that which existed at the surface in its original position prior to the application of the mesh. Experience has shown that this spacing must be reduced to the order of .001 inch for equivalent results, a value which poses serious problems if guns utilizing such spacing are to be mass produced by present day techniques.

Such spacing dictates the need for extreme care in applying the electron-permeable mesh to the cathode side of the control electrode aperture. Conventional welding techniques are unsatisfactory because of the spatter normally associated with such processes. Any irregularity or protrusion extending from the mesh-control electrode assembly can result in a cathode-to-control electrode electrical "short" which would naturally render the gun inoperative. Additionally, the use of fine-grain emissive material and extreme care in its application to the surface of the cathode are required to prevent a like result due to irregularities in the emissive surface. This problem is even better appreciated when it is remembered that this spacing must be maintained with extreme accuracy throughout the wide temperature variations to which control electrode and cathode are subjected during normal operation of the gun.

A second problem is introduced which results from the light-like properties of an electron stream. In a conventional electron gun the acceleration field in the region of the control electrode aperture displays equipotential surfaces which become increasingly convex as the aperture is approached; hence a convergent lens is formed. As a result all of the electrons emitted from any particular point on the surface of the cathode converge to a discrete point which lies on a transverse plane normally referred to as the cross-over. By imaging the cross-over on the phosphor screen, spot non-uniformity resulting from discontinuities in the cross-section of the electron stream is avoided. The placement of a conductive mesh over the control electrode aperture destroys this lens action by replacing the single lens with a plurality of tiny coplanar lenses (each of the mesh interstices acts as a lens), each of which affects only that portion of the electron stream which passes through it. Hence the mesh image acquired by the electron stream as it passes through the mesh interstices is retained and results in the production of a non-uniform spot on the phosphor screen. Passage of the electron stream through the interstices of the mesh results in a stream having a cross-section which contains an image of the mesh structure. If uncompensated for, this image results in non-uniformity of the spot produced on the phosphor screen. The use of a gun, having such a beam characteristic, in a television picture tube results in an unacceptable degradation of picture quality.

In summation, it can be said that the use of a mesh-covered aperture in the control electrode, where the remainder of the gun is conventional in construction, requires the use of certain prohibitively expensive manufacturing techniques in the cathode-control grid region if the gun is to exhibit the desired improvement in transconductance while retaining a magnitude of average beam current commensurate with satisfactory light output at the phosphor screen. In addition, the use of such a mesh-covered aperture without additional compensation, results in a beam spot which contains an image of the mesh structure; hence the uniformity of the spot is destroyed and the overall picture quality suffers.

Accordingly, it is an object of the present invention to provide a new and improved cathode-ray tube for use in television receivers and the like.

It is still another object of the present invention to provide an electron gun for use in such tubes which has an effective transconductance in excess of an order of magnitude greater than that of conventional present-day electron guns.

It is a further object of the present invention to provide a high-transconductance electron gun for use in such tubes in which the average brightness of the reproduced image is equivalent to that obtainable from conventional present day electron guns.

It is a still further object of the present invention to provide a high-transconductance electron gun for use in such tubes in which the beam spot produced at the phosphor screen is substantially uniform in light intensity over its entire area.

It is an additional object of the present invention to provide a high-transconductance electron gun which poses no serious manufacturing problems by the use of excessively small electrode spacings.

In accordance with the present invention, a high-transconductance electron gun for use in image reproducers of the cathode-ray type comprises a thermionic cathode together with means, including a control electrode having an aperture provided with a superimposed electron-permeable conductive element and disposed in close proximity to the thermionic cathode, for creating an electric field between the thermionic cathode and the control electrode to draw emission therefrom, a portion of which passes through the electron-permeable element and the associated aperture to form an electron stream. Additional means including an accelerator-electrode system are provided for accelerating and forming the electron stream into a discrete electron beam. Means including an apertured auxiliary electrode intermediate the control electrode and the accelerator-electrode system and cooperating therewith are provided for causing convergence of the electron stream in the space interjacent the auxiliary electrode and the accelerator-electrode system.

The features of the invention which are believed to be novel are set forth with particularity in the appended claims. The organization and manner of operation of the invention, together with further objects and advantages thereof, may best be understood by reference to the following description taken in conjunction with the accompanying drawings, in which:

Figure 1:
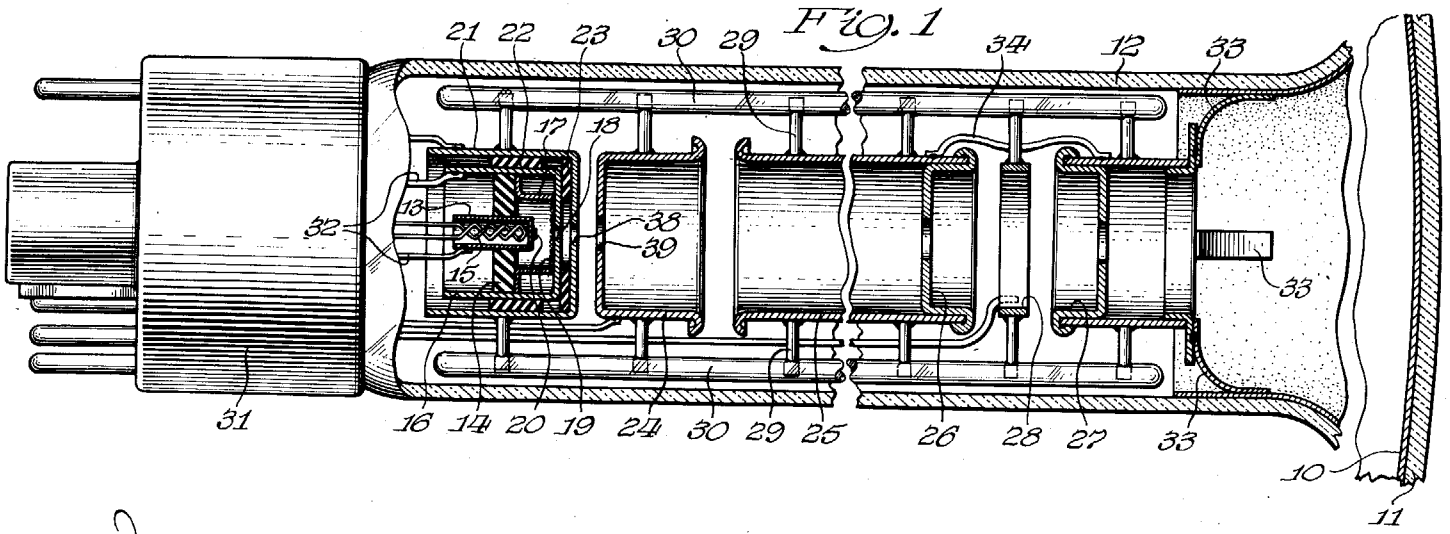
FIGURE 1 is a fragmentary side elevation, partly in cross-section and partly cut away, of an image reproducer of the cathode-ray type incorporating an electron gun constructed in accordance with the present invention.

The image-reproducing device of FIGURE 1 comprises a phosphor screen 10 affixed to the transparent glass face-plate portion 11 of a cathode-ray tube envelope which also includes a glass neck portion containing an electron gun and an electrostatic focusing-electrode system. The electron gun includes a tubular indirectly heated cathode 13 supported by an annular ceramic member 14. A filament or heater 15 of any well known type is contained within the tubular cathode 13. The annular ceramic member 14 is internally supported within a tubular control electrode 16 and is spaced an appropriate predetermined distance from the closed end of the control electrode by an annular spacer member 17 which has an L-shaped cross section. Control electrode 16 contains an aperture 18 of appropriate size which is covered, on the side facing cathode 13, with an electron-permeable conductive cover here shown as a mesh 19. An electron-emissive coating 20 is affixed to the end face of cathode 13 immediately adjacent mesh 19. Control electrode 16 is coaxially mounted within and spaced from a tubular auxiliary electrode 21 between annular ceramic spaced members 22 and 23. Auxiliary electrode 21 is provided with an end closure plate having a central aperture 38 which is coaxial with aperture 18 and emissive coating 20.

The accelerator electrode system, comprising additional tubular electrodes 24 and 25, may be of conventional design and is mounted in coaxial spaced relation to the aforementioned control and auxiliary electrodes. Focusing of the resulting electron-beam may be accomplished by the use of an Einzel or unipotential lens composed of cup-shaped apertured electrodes 26 and 27 together with intermediate ring electrode 28. In view of the fact that both the accelerator and electrostatic-focusing systems are of well known conventional design no further comment on the physical structure of the individual electrodes which compose these systems is deemed necessary.

All of the electrodes, with the exception of cathode 13 and control electrode 16, may be supported in their respective positions by extension pins 29 imbedded in glass pillars 30. Connections for the various electrodes are brought out to appropriate pins on the base 31 by means of semi-rigid conductors of which 32 is a typical example. The electrostatic lens elements 26 and 27 are connected to the customary final anode conductive coating affixed to the interior wall of the envelope by resilient contact members 33 and a conductive jumper 34.

As has been previously mentioned, in the operation of conventional electron guns electron emission is drawn from the cathode region through the aperture contained in the control electrode by the penetration of the electric field originating in the accelerator electrode system. This being so the electron density of the resulting stream is most easily varied by effectively varying the cross-sectional area of the control electrode aperture and hence the depth of accelerator field penetration. While it is, of course, impractical to introduce this variation by physically changing the cross-sectional area of the control-electrode aperture, it can be readily accomplished electrically by placing a variable negative potential on the control electrode relative to the cathode. By applying a negative potential of sufficient magnitude to the control electrode, the accelerator field is totally prevented from penetrating through the control-electrode aperture to the region of the cathode, and the density of the electron stream is reduced to zero. In guns of conventional design, this "cut-off" potential normally ranges between 50 and 80 volts negative. The variation of beam current as a function of negative control potential in a typical conventional present-day electron gun is shown as curve 36 in FIGURE 3. When used in a television receiver application, guns of this type are normally biased by the application of a steady-state negative potential of a magnitude determined by the desired average brightness of there produced image. Video signals of appropriate polarity are applied between the control electrode and the cathode to impart the video information to the resulting electron stream in the form of intensity modulation. Variations in the magnitude of the steady-state bias potential manifest themselves as changes in the average beam current and subsequent variations in the average brightness of the reproduced image.

If now, an electron-permeable mesh is placed over the control-electrode aperture in an effort to increase the effective transconductance of the gun, the mesh will have the effect of screening the cathode region, making penetration by the accelerator field extremely difficult. This reduces the range of average beam current that can be drawn from the cathode if accelerator field penetration is solely relied upon. To compensate for this shielding effect it is necessary to employ an impractically small cathode-control electrode spacing, as has been previously described. From this it is clear that this conventional mode of operation, while theoretically possible, imposes practical problems which require further modification of the gun structure.

In an electron gun embodying the present invention this difficulty is avoided by operating the control electrode 16 at a low positive bias potential to draw electrons from the cathode emissive surface 20 through the control-electrode mesh 19 and the associated aperture 18. In a tube of this construction, the formation of the electron stream is no longer dependent upon penetration of the accelerator field, and the cathode-control electrode spacing may be maintained at the conventional figure of approximately .004 inch. When maintained at a low positive potential, control electrode 16 performs as a space charge grid tending to reduce the current limiting effects of the space charge in the vicinity of cathode emissive surface 20 and permitting a portion of this charge to pass through the interstices of mesh 19 to form an electron stream. The intensity of this resultant stream is, of course, a function of the potential applied to control electrode 16.

By virtue of the fact that control electrode 16 is operated at a low average positive potential relative to the cathode, a portion of the total emission current is collected by the electron-opaque portions of the control electrode 16. Since this current serves no useful purpose, relative to the operation of the overall gun, it is preferably held to a minimum by the use of a restricted-area cathode. Thus, the emissive coating 20 is not applied to the complete face of cathode 13 as is customarily done but is rather restricted to the small area which is directly adjacent the mesh-covered aperture 18. For best results, the area of the emissive surface is made substantially equal to the area of aperture 18. With the emissive area so restricted, the current collected by the control electrode remains well within acceptable limits over the normal range of positive potentials applied to the control electrode.

Moreover, there is apparently an additional advantage in the use of a restricted-area cathode, in that the entire emissive coating 20 is at all times maintained active. As is well known to those active in vacuum tube design, continuous heating of the almost-universally employed oxide-coated cathodes without the drawing of emission therefrom often results in rapid deterioration of the emissive material. The cause of this phenomenon, often termed "sleeping sickness," is not, at present, fully understood but the difficulty is prevalent in switch tubes, gating tubes, and the like where relatively long periods of non-conduction are encountered. The cathodes of picture tubes of conventional design also suffer, to some extent, from this malady. Since the control electrode of a conventional cathode-ray tube is normally operated at a relatively high negative potential relative to the cathode, the cathode emissive surface, with the exception of the small central area from which the beam current is drawn, is continuously heated but emissively inactive. It is believed that this non-emissive heating may be one of the major factors contributing to the premature fall-off of cathode emission which often terminates the useful life of cathode-ray tubes. Since the control electrode of a cathode-ray tube embodying the invention is operated at a positive potential, the cathode emissive coating is not subject to extended periods of non-emissive heating, and any adverse effect thereof on the life expectancy of the tube is eliminated.

As previously mentioned, the passage of an electron stream through an aperture covered with a lattice of electron-opaque mesh wires results in an electron stream cross-section which contains an image of the mesh. In prior cathode-ray tubes employing electrodes with mesh-covered apertures, the resulting spot is subdivided into a plurality of smaller spots representative of the interstices of the mesh. This spot non-uniformity has a degrading effect on the composite video picture and hence is unacceptable under established standards for picture quality. In accordance with the invention, this effect is eliminated by causing the electron stream to converge to a point or "cross-over" prior to its entry into the beam forming and focusing electrode systems.

In the device of FIGURE 1, auxiliary electrode 21, which is disposed intermediate the control electrode 16 and the first electrode 24 of the accelerator electrode system, serves to bring about this convergence. Auxiliary electrode 21 is maintained at or slightly below the potential of cathode 13 to establish a convergent electric field between this electrode and the adjacent electrodes 16 and 24, thus causing the electron stream to converge to a "cross-over" at a point interjacent the auxiliary electrode 21 and the first accelerator electrode 24. The application of proper positive potentials to the accelerator electrodes 24 and 25 and the electrostatic focusing system composed of electrodes 26, 27 and 28 results in a focused spot on phosphor screen 10 which is an image of the "cross-over" rather than the emissive surface of the cathode and hence is uniform through its cross-section.

Figure 2:
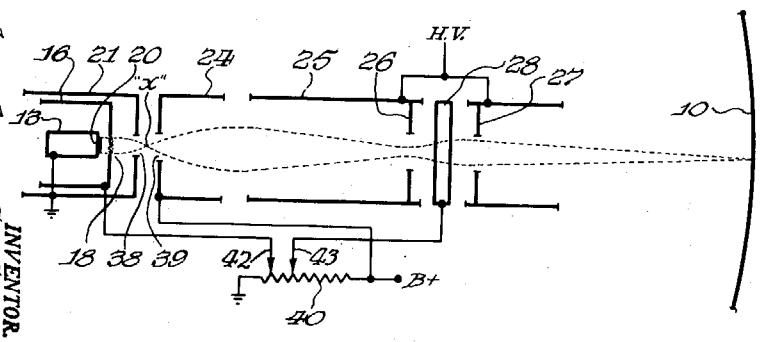
FIGURE 2 is a schematic diagram of the electrode system of the device of FIGURE 1 showing the effects of the various electrodes on the electron stream.

The effect of auxiliary electrode 21 on the electron stream is shown in FIGURE 2. The electron stream, indicated by the dashed outline, is converged to a "cross-over" designated "X" in the region interjacent the electrode 21 and the first accelerator 24 after passage of the electron stream through apertures 18 and 38 and prior to the passage of the stream through aperture 39 into the accelerator electrode system. The diverging electron stream is formed into a high-velocity discrete electron-beam by the electric field established by the accelerator-electrode system composed of electrodes 24 and 25. The beam then passes through the unipotential electrostatic focusing system composed of electrodes 26, 27 and 28 where it is acted upon by appropriately directed electric fields to focus the image of the "cross-over" on the phosphor screen 10. A unidirectional voltage source, here designated B+, in combination with voltage divider 40 serves as the potential source for the various electrodes. Adjustable taps 42 and 43 permit the application of appropriate potentials to control electrode 16 and ring focusing electrode 28. While the auxiliary electrode 21 is shown in FIGURE 2 as being operated at the same potential as the cathode 13, this is not essential since equally satisfactory results are obtained if the auxiliary electrode 21 is operated over a range extending from several volts positive to several volts negative relative to the cathode. The only effect is to shift the position of the "cross-over" longitudinally in the region bordered by the auxiliary electrode 21 and the first acceleator electrode 24.

Experience has shown that auxiliary electrode 21 may, in fact, be operated at the same potential as control electrode 16 with identically the same result. The embodiment shown in FIGURE 4 makes use of this fact to provide a substantial simplification in the structure of auxiliary electrode 21. Instead of the tubular shaped auxiliary electrode of FIGURE 1, a flat washer-shaped electrode 41 is used. This electrode is electrically and mechanically affixed to the front surface of control electrode 16. To provide substantially the same effective spacing between apertures 18 and 38 as in the embodiment of FIGURE 1, the surface of control electrode 16, in the vicinity of aperture 18, is coined to an appropriate depth. It should be pointed out that the thickness of ceramic spacer 23, as shown in FIGURE 1, is somewhat exaggerated for the sake of clarity. In reality, this spacer is approximately .007 inch thick while the material from which all electrodes are formed is approximately .010 inch stock. Accordingly, it can be seen that the aperture 18 to aperture 38 spacing of FIGURE 1 can be retained in the embodiment of FIGURE 4 by the removal of an appropriate amount of material from either electrode 16 or auxiliary electrode 41, or both.

Figure 4:
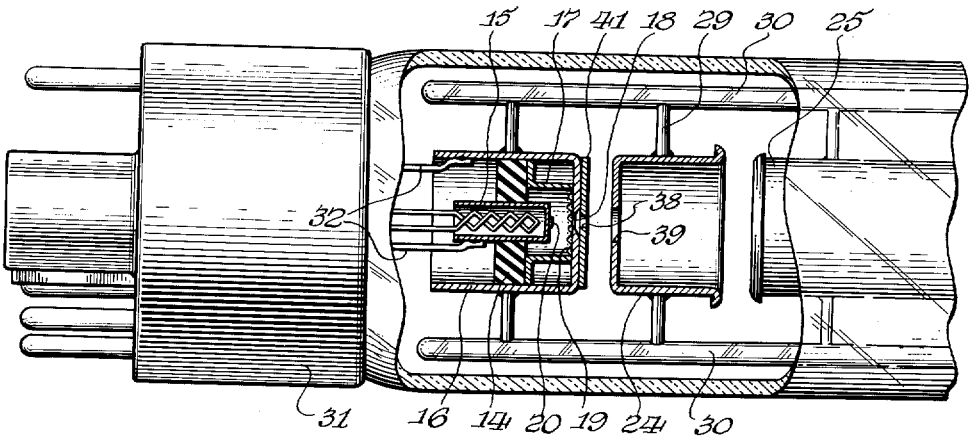
FIGURE 4 is a partial view, similar to a portion of FIGURE 1, of another embodiment of the invention.

All of the comments heretofore made in regard to the device of FIGURE 1 apply equally to the device of FIGURE 4. In addition, the structure of FIGURE 4 results in a significant cost saving over that of FIGURE 1 by eliminating the need for spacers 22 and 23 and by the use of the simple washer-shaped auxiliary electrode 41 in place of the relatively complex tubular shaped auxiliary electrode 21.

Figure 3:
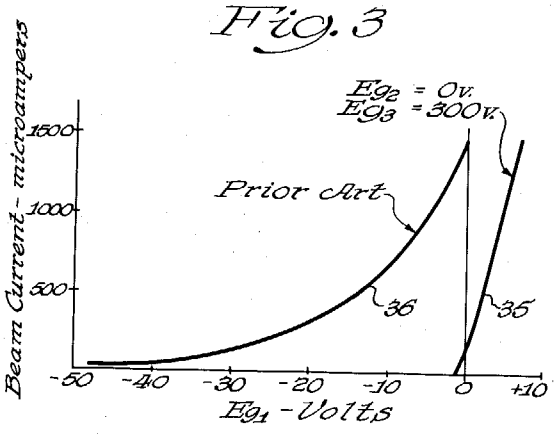
FIGURE 3 is a graphical representation of one of the operating characteristics of the devices of FIGURES 1 and 4 compared with a like characteristic of a conventional present-day electron gun.

A typical operating characteristic of the electron gun of FIGURE 1 is graphically represented as curve 35 of FIGURE 3, in which beam current is plotted as a function of the voltage applied to control electrode 16, with auxiliary electrode 21 maintained at cathode potential and accelerating anode 24 at 300 volts positive. Beam current is sharply cut off by the application of a potential one to two volts negative, and a beam current variation through a range comparable to that achieved with a 50- to 80-volt input signal in conventional tubes (curve 36) is achieved by varying the control electrode potential from the aforementioned negative value to approximately eight volts positive. Thus an electron gun constructed in accordance with the present invention has a transconductance of at least an order of magnitude greater than that of a conventional electron gun. Also it is significant to note that the variations in beam current are substantially a linear function of control-electrode potential, which is sharply in contrast with the remote-cutoff or variable-mu characteristic 36 of a conventional electron gun. It should be noted that the operating characteristic of the device of FIGURE 4 is substantially the same as that of the device of FIGURE 1; hence curve 35 of FIGURE 3 applies equally to both.

While the particular embodiment of the present invention shown in FIGURE 1 uses electrostatic focusing means of the unipotential type, it should be understood that any of the well known electrostatic or magnetic focusing means may be used with equally satisfactory results. Also, while a "straight" gun devoid of ion trapping means is shown, identically the same control and auxiliary electrode structures can be used with any of the well known gun configurations which include ion trapping means, e.g. offset gun, and the much improved effective transconductance is retained. Additionally, while in the particular embodiments described, the mesh is a separate element affixed to the side of the control-electrode aperture adjacent the cathode, similar results are obtained with the mesh co-planar with the surface of the control electrode or affixed to the side remote from the cathode.

Merely by way of illustration and in no sense by way of limitation, the following is a tabulation of the unconventional electrode dimensions and spacings of an operative embodiment of the invention of the type shown in FIGURE 1. The operating characteristic 35 of FIGURE 3 was obtained with a tube of the type shown in FIGURE 1 having the following dimensions:

| | |
|---|---|
| Diameter of cathode **13** | .090 inch |
| Diameter of emissive coating **20** | .040 inch |
| Cathode **13** to control electrode **16** spacing | .004 inch |
| Diameter of control electrode aperture **18** | .035 inch |
| Control electrode **16** to auxiliary electrode **21** spacing | .007 inch |
| Diameter of auxiliary electrode aperture **38** | .040 inch |
| Auxiliary electrode **21** to first accelerator electrode **24** spacing | .020 inch |
| Conductive mesh **19** | 200 mesh per inch .0004 inch thick |

An electron gun constructed in accordance with the present invention exhibits an effective transconductance of at least an order of magnitude greater than that normally obtained with electron guns of conventional design. By operating the control electrode at a low positive bias potential relative to the cathode, emission is made independent of accelerator field penetration, hence cathode to control electrode spacing need not be reduced but may be held substantially the same as that found in conventional guns. The mesh image acquired by the electron stream in passing through the interstices of the mesh-covered aperture in the control electrode is prevented from degrading the reproduced image at the phosphor screen by imaging a "cross-over" of the electron stream rather than the surface of the cathode. This "cross-over" is caused to occur, prior to the passage of the electron stream into the region of the accelerator and the focusing electrode systems, by the inclusion of an apertured, properly-biased auxiliary electrode intermediate the control electrode and the accelerator electrode system. There are no electrode spacings which are extraordinarily small nor dimensionally critical enough to introduce manufacturing problems uncommon to conventional electron gun construction. Adequate average beam current is available to insure acceptable brightness of the reproduced image at the phosphor screen. Presently available transistors, when used in appropriate video circuitry, are capable of producing sufficient video drive to produce image intensity and contrast commensurate with presently acceptable reproduction standards.

While particular embodiments of the invention have been shown and described, it is apparent that changes and modifications may be made without departing from the invention in its broader aspects. The aim of the appended claims, therefore, is to cover all such changes and modifications as fall within the true spirit and scope of the invention.

I claim:

1. In an image reproducer of the cathode-ray type: a thermionic cathode; means including a control electrode having an aperture *of predetermined size and* provided with a superimposed electron-permeable *planar* conductive element and disposed in close proximity to said thermionic cathode for creating an electric field between said thermionic cathode and said control electrode to draw emission therefrom, a portion of which passes through said electron permeable element and said aperture to form an electron stream; means including an accelerator-electrode system for accelerating and forming said electron stream into a discrete electron beam; an apertured auxiliary electrode disposed intermediate said control electrode and said accelerator-electrode system *with its aperture of approximately said predetermined size*; and means for biasing said auxiliary electrode at a potential of a value relative to that on said accelerator-electrode system and said control grid and of a magnitude enforcing convergence of said electron stream at a point interjacent said auxiliary electrode and said accelerator-electrode system.

2. An image reproducer of the cathode-ray type [constructed in accordance with] *as defined in* claim 1, in which said control electrode is maintained at a low positive potential and said auxiliary electrode is maintained at a potential ranging from several volts positive to several volts negative, both relative to said cathode.

3. An image reproducer of the cathode-ray type [constructed in accordance with] *as defined in* claim 2, in which said auxiliary electrode is electrically connected to said cathode.

4. An image reproducer of the cathode-ray type [constructed in accordance with] *as defined in* claim 2, in which such auxiliary electrode is electrically connected to and maintained at the operating potential of said control electrode.

5. An image reproducer of the cathode-ray type [constructed in accordance with] *as defined in* claim 1, in which said thermionic cathode contains an electron-emissive coating coaxial with, and of an area substantially equal to, the area of said control electrode aperture.

6. In an image reproducer of the cathode-ray type; a thermionic cathode; means including a control electrode having an aperture provided with a superimposed electron-permeable conductive element and disposed in close proximity to said thermionic cathode for creating an electric field between said thermionic cathode and said control electrode to draw emission therefrom, a portion of which passes through said electron-permeable element and said aperture to form an electron stream; means including an accelerator-electrode system for accelerating and forming said electron stream into a discrete electron beam; and an apertured auxiliary electrode disposed intermediate said control electrode and said accelerator-electrode system with its aperture aligned with and approximately the size of that in said control electrode to constitute with the latter and said accelerator-electrode system a convergent electrostatic lens between said auxiliary electrode and said accelerator-electrode system.

7. An image reproducer of the cathode-ray type [constructed in accordance with] *as defined in* claim 6, in which said electron-permeable conductive element is a conductive mesh.

8. An image reproducer of the cathode-ray type, [constructed in accordance with] *as defined in* claim 6, in which said auxiliary electrode is in the form of an annular disc conductively affixed to the side of said control electrode remote from said cathode.

*9. An image reproducer as defined in claim 1 in which the aperture in said auxiliary electrode has a diameter of approximately 0.040 inch and the aperture in said control electrode has a diameter of approximately 0.035 inch.*

*10. An image reproducer as defined in claim 9 in which said accelerator-electrode system is spaced along the electron stream path approximately 0.020 inch beyond said auxiliary electrode.*

References Cited in the file of this patent or the original patent

UNITED STATES PATENTS

| | | |
|---|---|---|
| 2,229,766 | Nicoll et al. | Jan. 28, 1941 |
| 2,306,663 | Schlesinger | Dec. 29, 1942 |
| 2,426,626 | Llewellyn | Sept. 2, 1947 |
| 2,441,254 | Stromeyer | May 11, 1948 |
| 2,538,267 | Pierce et al. | Jan. 16, 1951 |
| 2,563,490 | Thalner | Aug. 7, 1951 |
| 2,644,906 | Bondley | July 7, 1953 |
| 2,672,568 | Cole | Mar. 16, 1954 |
| 2,690,517 | Nicoll | Sept. 28, 1954 |
| 2,825,837 | Dudley | Mar. 4, 1958 |
| 2,835,838 | De Gier | May 20, 1958 |
| 2,877,369 | Nicoll | Mar. 10, 1959 |

FOREIGN PATENTS

| | | |
|---|---|---|
| 658,287 | Great Britain | Oct. 3, 1951 |